United States Patent
Boun Hong et al.

(10) Patent No.: US 11,755,422 B2
(45) Date of Patent: Sep. 12, 2023

(54) STAGED DATA BACKUP

(71) Applicant: International Business Machines Corporation, Armonk, NY (US)

(72) Inventors: Ly Boun Hong, Ivry-sur-Seine (FR); Xu Chun Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 17/400,724

(22) Filed: Aug. 12, 2021

(65) Prior Publication Data

US 2023/0048605 A1 Feb. 16, 2023

(51) Int. Cl.
*G06F 11/14* (2006.01)
*H04L 67/06* (2022.01)

(52) U.S. Cl.
CPC ...... *G06F 11/1461* (2013.01); *G06F 11/1451* (2013.01); *G06F 11/1464* (2013.01); *H04L 67/06* (2013.01)

(58) Field of Classification Search
None
See application file for complete search history.

(56) References Cited

U.S. PATENT DOCUMENTS

| 7,039,778 | B2 | 5/2006 | Yamasaki |
| 10,216,583 | B1 * | 2/2019 | Krinke ................ G06F 16/184 |
| 10,467,102 | B1 * | 11/2019 | Baruch ............... G06F 16/2255 |
| 10,565,067 | B2 | 2/2020 | Dornemann |
| 2013/0191347 | A1 * | 7/2013 | Bensinger .......... G06F 11/2097 707/649 |
| 2013/0238730 | A1 | 9/2013 | Nir |
| 2015/0301899 | A1 | 10/2015 | Montulli |
| 2019/0163370 | A1 * | 5/2019 | Sure .................. G06F 11/0793 |
| 2021/0034395 | A1 * | 2/2021 | Denny ............... G06F 11/1453 |
| 2021/0365324 | A1 * | 11/2021 | Wang ................. G06F 11/3006 |

FOREIGN PATENT DOCUMENTS

JP 4611795 B2 1/2011

OTHER PUBLICATIONS

"Loading Data into Databricks Delta Lake", Streamsets, downloaded from the internet on Feb. 5, 2021, 24 pages, <https://docs.streamsets.com/portal/#controlhub/latest/help/datacollector/UserGuide/Solutions/DeltaLake.html>.

(Continued)

*Primary Examiner* — Nathan Sadler
(74) *Attorney, Agent, or Firm* — Monchai Chuaychoo

(57) ABSTRACT

An approach for staged data backup is provided. The approach comprises downloading data to be backed up, by one or more processors, from at least one of cloud computing servers in a plurality of stages into a local cache, wherein each of the plurality of stages corresponds to a time point when a corresponding downloading operation starts, and a time point corresponding to the last stage of the plurality of stages is the time point when a request to back up the data is received. The approach comprises merging, by one or more processors, downloaded data corresponding to each of the plurality of stages into up-to-date data. The approach further comprises saving, by one or more processors, the merged up-to-date data corresponding to the last stage as a backup dataset.

20 Claims, 7 Drawing Sheets

(56) References Cited

OTHER PUBLICATIONS

"New Features in 9.4.0", Bacula.org, downloaded from the internet on Feb. 5, 2021, 6 pages, <https://www.bacula.org/11.0.x-manuals/en/main/New_Features_in_9_4_0.html>.
Chatterjee, Shubhankar, "Bandwidth Throttling for Cloud Backup", Clumio, Nov. 26, 2019, 5 pages, <https://clumio.com/bandwidth-throttling-for-cloud-backup/>.
Mell et al., "The NIST Definition of Cloud Computing", Recommendations of the National Institute of Standards and Technology, Special Publication 800-145, Sep. 2011, 7 pages.

* cited by examiner

STAGED DATA BACKUP

BACKGROUND

The present invention relates to computer technologies and more particularly, to a method, system, and computer program product for staged data backup in a cloud computing environment.

As known, data backup is a basis of disaster recovery. In the cloud computing environment, the data backup may refer to a process of downloading all or part of the data set from severs to local storage media via external network in order to prevent data loss. In a local environment or a local area network computing environment, the data backup may refer to a process of copying all or part of the data set from hard disks or arrays to other storage media in order to prevent data loss. In practice, the data backup in the cloud computing environment may face more challenges compared with that in the local environment or the local area network computing environment.

SUMMARY

Embodiments of the present disclosure disclose computer-implemented methods, systems, and computer program products. According to some embodiments of the present disclosure, the computer-implemented method comprises downloading data to be backed up, by one or more processors, from at least one of cloud computing servers in a plurality of stages into a local cache, wherein each of the plurality of stages corresponds to a time point when a corresponding downloading operation starts, and a time point corresponding to the last stage of the plurality of stages is the time point when a request to back up the data is received. The computer-implemented method comprises merging, by one or more processors, downloaded data corresponding to each of the plurality of stages into up-to-date data. The computer-implemented method further comprises saving, by one or more processors, the merged up-to-date data corresponding to the last stage as a backup dataset.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Through the more detailed description of some embodiments of the present disclosure in the accompanying drawings, the above and other objects, features, and advantages of the present disclosure will become more apparent, wherein the same reference generally refers to the same components in the embodiments of the present disclosure.

Figure 1:
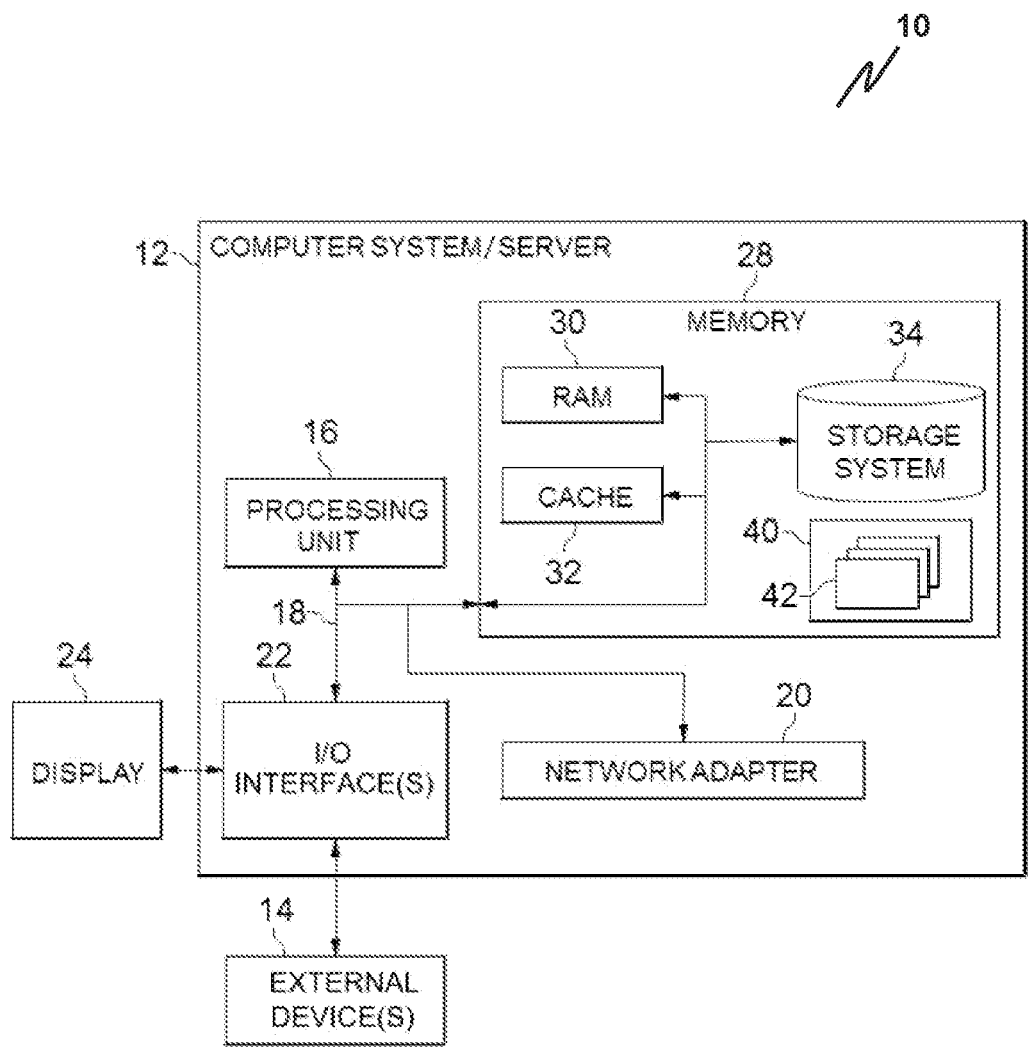
FIG. 1 depicts a cloud computing node according to some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned, and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly level out and rapidly released to quickly level in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown, according to some embodiments of the present disclosure. Cloud computing node 10 is only one example of a suitable cloud computing node and is not intended to suggest any limitation as to the scope of use or functionality of embodiments of the disclosure described herein. Regardless, cloud computing node 10 is capable of implementing and/or performing any of the functionality set forth herein.

In cloud computing node 10 there is a computer system/server 12, which can be a portable electronic device such as a communication device, and/or numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor bus or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product 40 having a set (e.g., at least one) of program modules 42 that are configured to carry out the functions of embodiments of the disclosure.

Program product 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, and a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
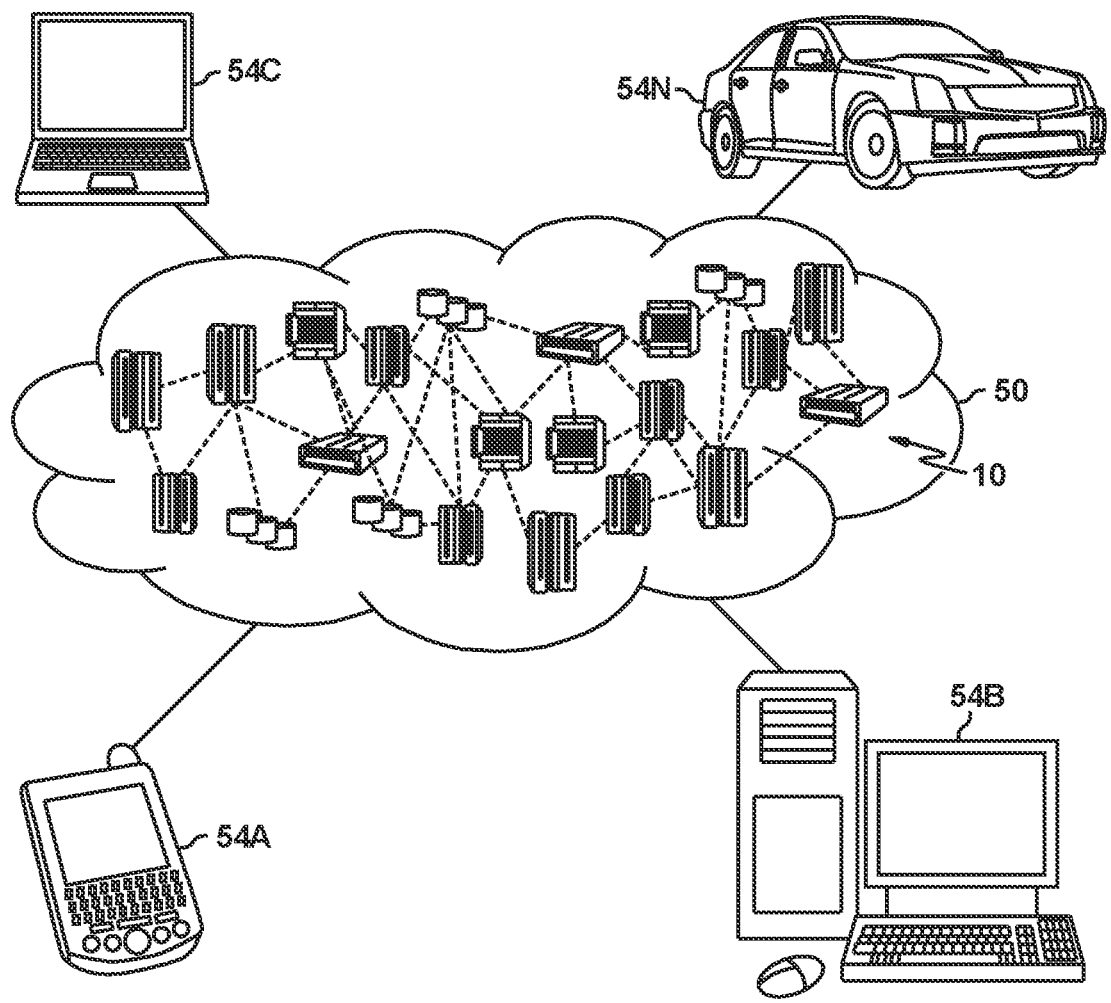
FIG. 2 depicts a cloud computing environment according to some embodiments of the present disclosure.

Referring now to FIG. 2, illustrative cloud computing environment 50 is depicted, according to some embodiments of the present disclosure. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
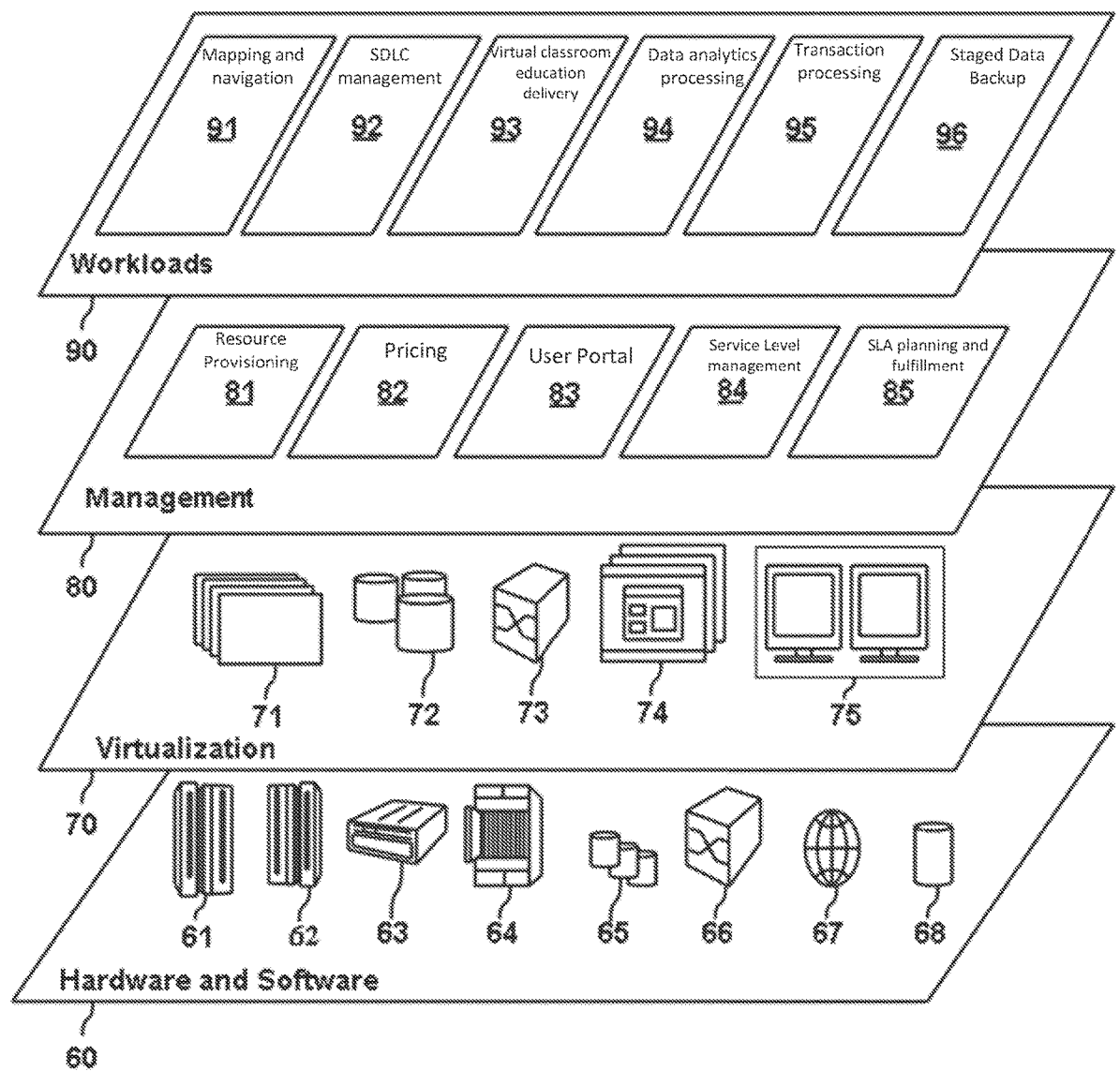
FIG. 3 depicts abstraction model layers according to some embodiments of the present disclosure.

Referring now to FIG. 3, a set of functional abstraction layers provided by cloud computing environment 50 (FIG. 2) is shown, according to some embodiments of the present disclosure. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and staged data backup 96.

As mentioned above, in the cloud computing environment, data backup may refer to a process of downloading all or part of the data set from severs to local storage media via external network in order to prevent data loss. For example, emails and files may be downloaded from cloud servers to a local backup repository. Compared with the data backup within a local environment or a local area network environment, data backup in the cloud computing environment faces more challenges due to usage of external network and shared servers. The challenges may be discussed in detail in combination with FIG. 4.

Figure 4:
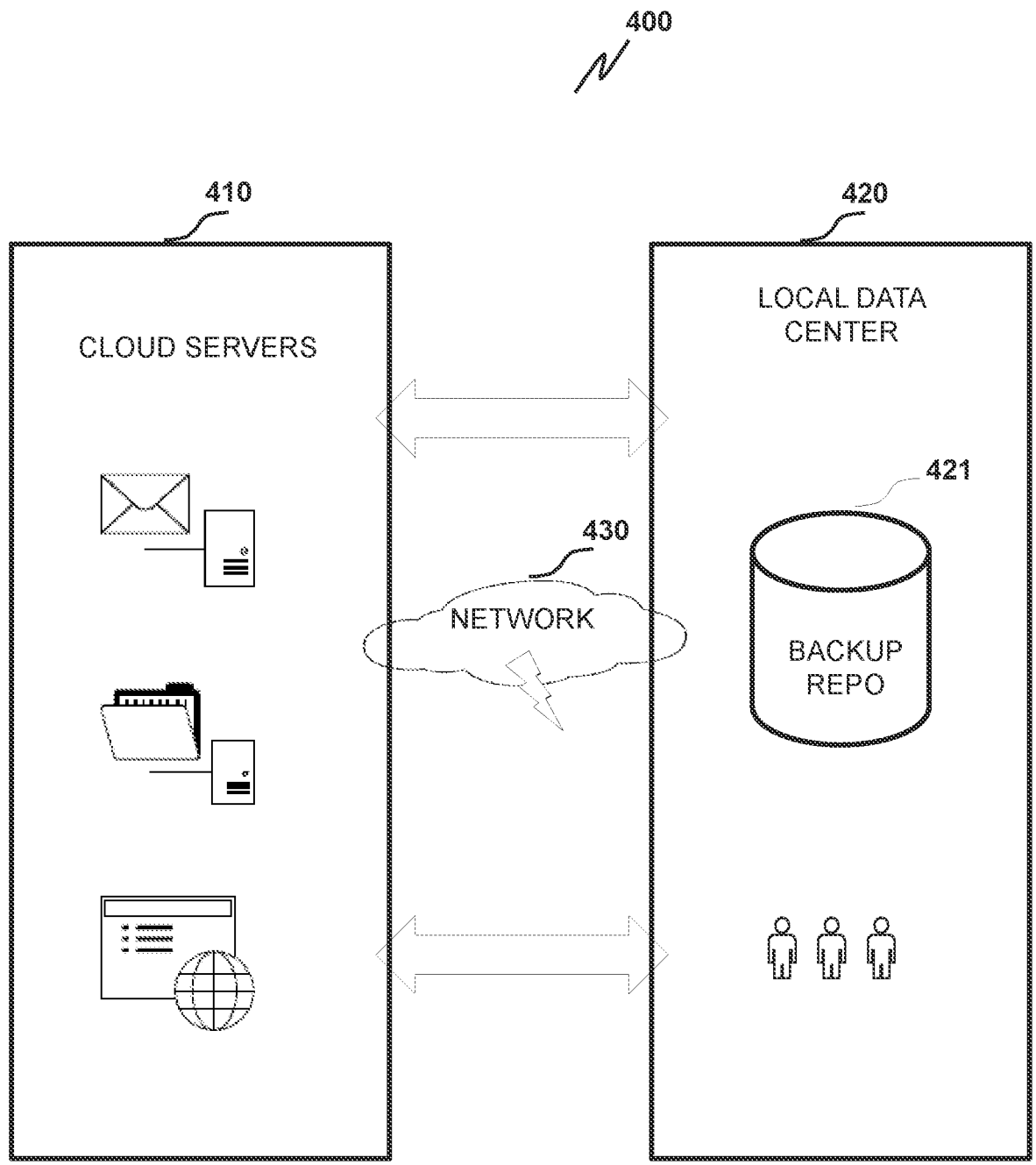
FIG. 4 depicts an example scenario of the data backup in a cloud computing environment.

Now referring to FIG. 4, which depicts an example scenario of data backup in the cloud computing environment 400. The cloud computing environment 400 may be, for example, the illustrative cloud computing environment 50 in FIG. 2. In the example scenario, the data may be transferred from servers in a cloud side, referred as cloud servers 410 herein, to a backup repository 421 in a local data center 420 via a network 430. The cloud servers 410 may be, for example, the computer system/server 12 shown in FIG. 1.

In the example scenario, the data to be backed up may be transmitted between the cloud servers 410 and the local data center 420 via the network 430 rather than a local area network. The data backup may be affected by the performance of the network 430, such as bandwidth, transmission rate, stability of the network and so on. On the other hand, in a non-cloud environment, servers, such as application servers, are autonomously controlled and there is no limit to amount or frequency of data transmission. While in the example scenario, the cloud servers 410 are usually provided by third parties, i.e., cloud providers, the cloud providers may have a throttle limitation in order to avoid network congestion. For example, the throttle limitation may limit peak value of speed of downloading data at a certain time or the total downloaded amount of data in each time period. The throttle limitation may be a factor affecting the data backup in the cloud computing environment 400. For example, if a user downloaded too much data within a time period, the throttle limitation may be triggered and operations of downloading may be disabled for the user for some time. In addition, in a process of the data backup in the cloud computing environment 400, network bandwidth and computing capability of the servers are shared by all the users. If one user occupies a large share, it may cause other users to have lower access rate or even unable to access. All these challenges mentioned above may lead to frequent failures and poor user experience during the data backup in the cloud computing environment 400.

According to embodiments of the present disclosure, there is proposed a solution for the data backup in the cloud computing environment to avoid network congestion and improve backup performance. In this solution, one downloading operation for the data backup is divided into a plurality of sub operations, and each sub operation is referred to as a stage. The process of one downloading operation is divided into a plurality of stages rather than completing the downloading operation for the data backup in one time. Thus, by downloading the data to be backed up in a plurality of stages, this solution may effectively avoid triggering throttle limitation of severs in the cloud computing environment.

Figure 5:
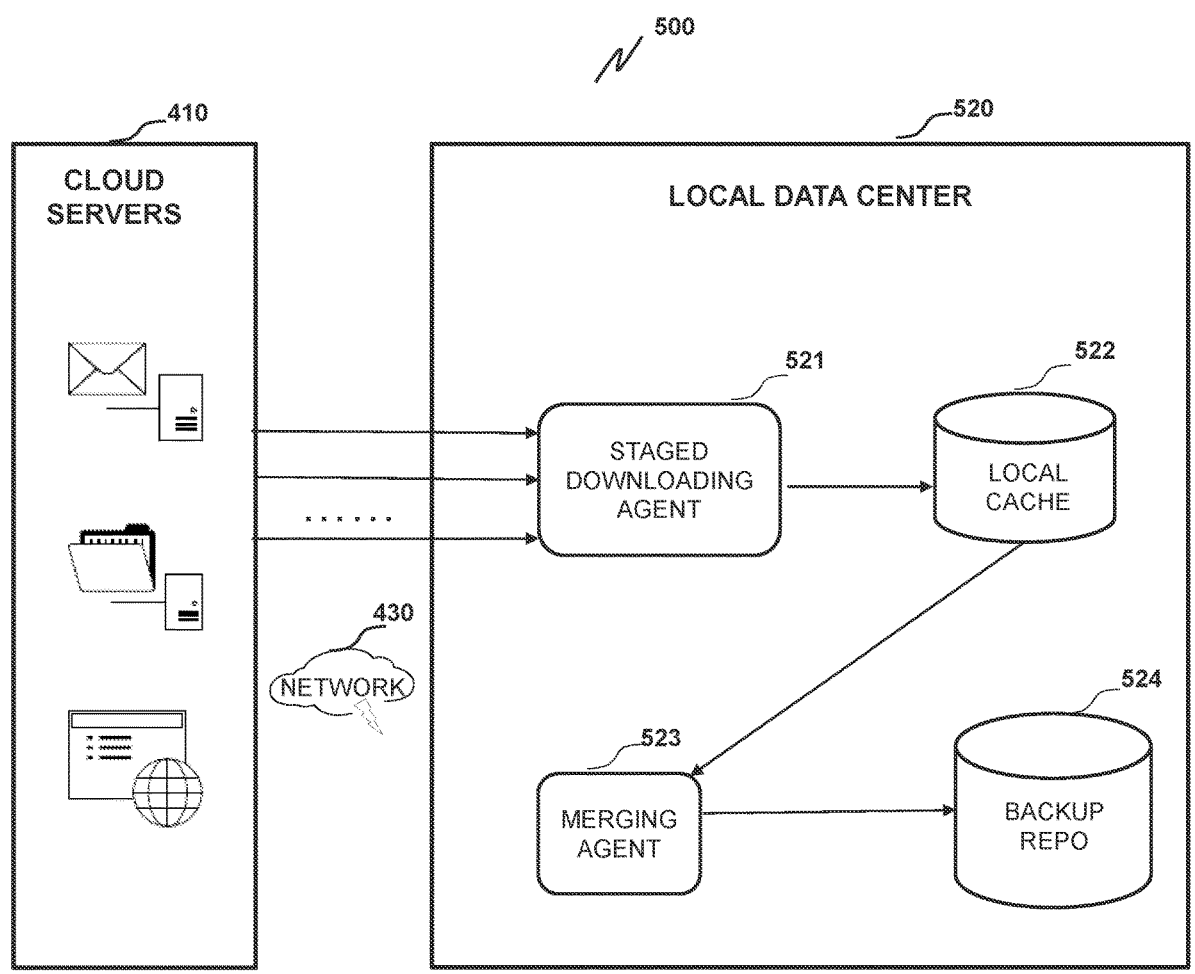
FIG. 5 depicts a schematic diagram of an example cloud computing environment comprising the staged data backup system according to embodiments of the present invention.

This solution may be implemented by a staged data backup system, for example, an example staged data backup system 520 depicted in FIG. 5.

With reference now to FIG. 5, which depicts a schematic diagram of the example cloud computing environment 500 comprising the staged data backup system 520 according to embodiments of the present invention. The staged data backup system 520 may be implemented in software, hardware, firmware, and/or any combination thereof.

As illustrated in FIG. 5, the example cloud computing environment 500 may include the cloud servers 410, the network 430, and the staged data backup system 520. The staged data backup system 520 may include a staged downloading agent 521, a local cache module 522, a merging agent 523, and a backup repository 524. It would be appreciated that the staged data backup system 520 is merely provided as a specific example, and the number of modules depicted in the FIG. 5 is merely shown for the purpose of illustration without implying any limitation. In other examples, a different number of modules may work together to provide a similar function or intention. Further, the staged data backup system 520 is configured in the client side for purpose of illustration, which is not intended to suggest any limitation. One or more functions of the components may be implemented in the cloud severs 410.

According to embodiments of the present disclosure, the staged downloading agent 521 may be configured to download data to be backed up from at least one of cloud computing servers in a plurality of stages into the local cache 522. Each of the plurality of stages corresponds to a time point when a corresponding downloading operation starts, and a time point corresponding to the last stage of the plurality of stages is the time point when a request to back up the data is received.

According to embodiments of the present disclosure, the staged downloading agent 521 may be further configured to determine the number of the plurality of stages based on the amount of data to be backed up, the estimated throttle limitation, available network bandwidth, historical data, requirements of a user and so on. For example, the data of a certain time period, such as 7:00 AM-7:00 PM every day, will be backed up for a user. The staged downloading agent 521 may set a value for the number of stages based on historical data. For another example, the staged downloading agent 521 may determine the number of stages based on the amount of data to be backed up and the estimated throttle limitation. The number of stages may be proportional to the amount of data to be downloaded and inversely proportional to the amount of data downloaded by a single user allowed by the throttle limitation. For example, the following formula can be used to calculate the number of stages: StageNumber=Max(DataSize)/ThrottleLimitation, wherein the "Max(DataSize)" may refer to the maximum amount of data to be downloaded for a single backup operation per unit time during a historical period. The "ThrottleLimitation" may refer to the amount of data to be downloaded by a single user allowed by the throttle limitation per unit time during a historical period. It should be noted that the "ThrottleLimitation" is normally set or adjusted by the server providers and only an estimated value may be used herein. For example, if the historical period is the last month, the largest amount of data downloaded for a single backup operation was 100 G/hour during the last month, and the estimated throttle limit may be 20 G/hour. Then the StageNumber=100/20=5.

In some embodiments, considering the server may be used by other normal users, a redundant value may be added to above formula. For example, the redundant value 1 is added as below: StageNumber=Max(DataSize)/ThrottleLimitation+1. Thus, in the case of a fixed amount of data to be downloaded, the number of stages increases 1, the amount of data to be transferred in each stage may be reduced so as to better avoid triggering throttle limitation.

According to embodiments of the present disclosure, the staged downloading agent 521 may be configured to determine the time point for corresponding stage to trigger corresponding downloading operation. It should be noted that the time point when a request to back up the data is received may be the time point corresponding to the last stage. So only the time points for corresponding stages other than the last stage need to be determined. The time point for corresponding stage may be determined based on the amount of data received by staged downloading agent from the cloud servers per unit time, estimated throttle limitation, available network bandwidth and a historical data. For example, considering that in the cloud environment, all users share network bandwidth to the servers and computing capability of the servers. Sometimes the servers may be busy, sometimes they may be idle. The time point for corresponding stage may be set to be in the idle time of the servers based on the historical data. For example, the time point for corresponding stage may be set to be in the night.

In some embodiments, the staged downloading agent 521 may be further configured to set a threshold for the amount of data received by the staged downloading agent 521 from the cloud servers per unit time. At a time point when the amount of data received by staged downloading agent from the cloud server per unit time is below the threshold, the downloading operation for corresponding stage may be started. In this way, the time point for corresponding stage may be determined. For example, a threshold may be set as 5 G/hour. When the amount of data received by the staged downloading agent 521 per unit time is below 5 G/hour, a time point may be determined as the time point for corresponding stage to start corresponding downloading operation.

In some embodiments, the staged downloading agent 521 may be configured to monitor the network performance.

When a time point with high available network bandwidth is found, the downloading operation for corresponding stage may be started.

In some embodiments, the staged downloading agent 521 may be configured to determine the time point for corresponding stage to trigger corresponding downloading operation based on both historical data and monitoring of the network performance.

According to embodiments of the present disclosure, the staged downloading agent 521 may determine the number of stages, then determine the corresponding time point to start corresponding downloading operation accordingly. The staged downloading agent 521 may also determine one or more time points to start corresponding downloading operation, and then determine the number of stages accordingly. The staged downloading agent 521 may dynamically adjust the number of stages and corresponding time points according to the actual situation and/or requirements of the user. Any other appropriate approaches may be used to determine the number of stages and/or corresponding time points.

According to embodiments of the present disclosure, the staged downloading agent 521 may be configured to download incremental data or changed data for the stage since the time point corresponding to the previous stage into the local cache 522. Herein the incremental data refers to newly generated data since last downloading operation.

Still referring to FIG. 5, the staged downloading agent 521 may be configured to download, at a time point corresponding to the current stage, incremental data or changed data occurred between time points corresponding to a previous stage and the current stage respectively.

Still referring to FIG. 5, the merging agent 523 may be configured to merge downloaded data corresponding to each of the plurality of stages into up-to-date data in the local cache 522. According to embodiments of the present disclosure, the merging agent 523 may further be configured to in response to the incremental data being existed, reserve the incremental data in the up-to-date data; and in response to the changed data being existed, replace corresponding data with the changed data in the up-to-date data. In this way, the merged data may be the up-to-date data set to be backed up at the time point when the request to back up the data is received.

Still referring to FIG. 5, the backup repository 524 may be configured to save the up-to-date data corresponding to the last stage as a backup dataset.

It should be noted that the downloading operations in the plurality of stages may be started before a backup request is received. The number of stages and corresponding time points may be adjusted dynamically over time based on the actual situation and/or the requirements of the user. If there is any failure during the downloading operations in a stage before a backup request is received, the stage may be retried and rescheduled.

The above modules in FIG. 5 may be discussed in detail in the following in combination with FIGS. 6-7.

Figure 6:
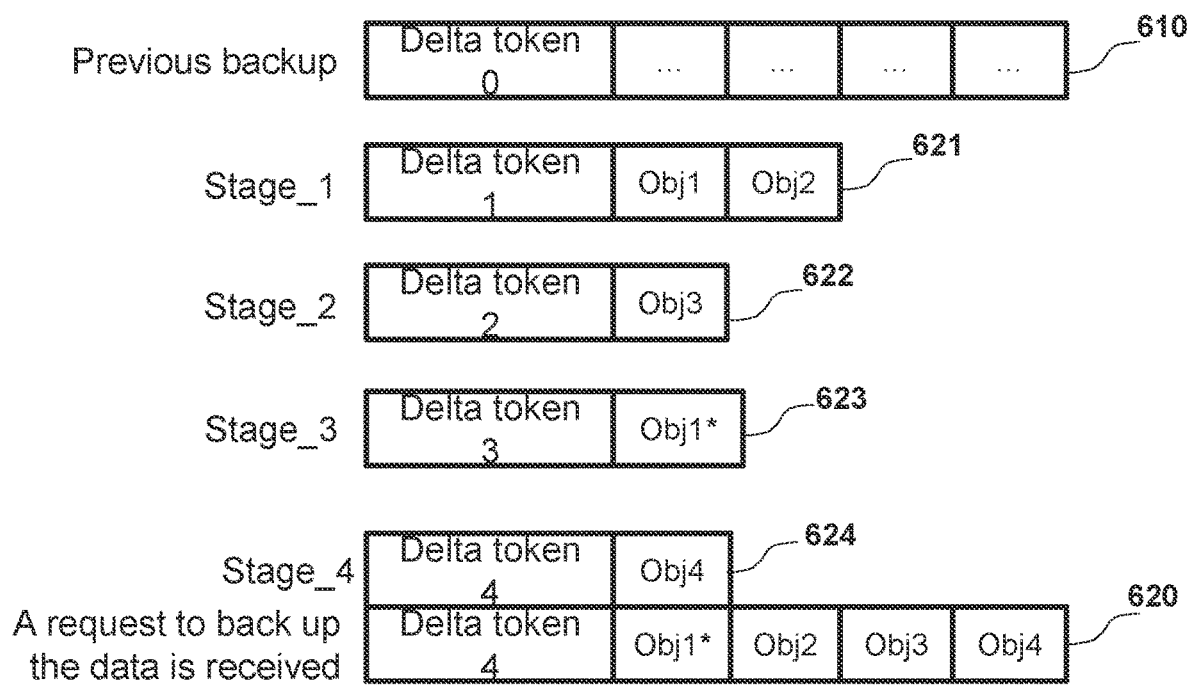
FIG. 6 depicts an example process for staged data backup according to embodiments of the present invention.

With reference now to FIG. 6, which depicts an example process for the staged data backup according to embodiments of the present invention. As illustrated, before a request to back up the data is received, the data to be backed up may be downloaded in 3 stages, Stage_1 621, Stage_2 622, and Stage_3 623 respectively. Before the operation of stage_1, a previous data backup 610 has been finished. A delta token 0 may be obtained from the cloud servers for the previous data backup 610. The delta token may refer to the time point to start corresponding downloading operation herein. The delta token may be used to query updates to data since the delta token is generated. The cloud servers may generate current delta token corresponding to current time point of current stage. The current delta token may be used to identify incremental data and changed data between the previous time point corresponding to the previous delta token and current time point corresponding to the current delta token. Once a first time point corresponding to the Stage_1 621 is determined, in the operation of the Stage_1 621, the staged downloading agent 521 may start to read and download incremental data since the time point of token 0 from the cloud servers 410 at the first time point. The incremental data may be marked as Obj1 and Obj2. At the same time, the staged downloading agent 521 may obtain a new delta token 1 corresponding to the first time point from the cloud server for Stage_1 621. The incremental data Obj1 and Obj2 may be stored in the local cache module 522.

Similarly, once a second time point corresponding to the Stage_2 622 is determined, in the operation of Stage_2 622, the staged downloading agent 521 may start to download the incremental data Obj3 generated since the first time point of token 1 at the second time point and also obtain a new delta token 2 corresponding to the second time point. The incremental data Obj3 may be stored in the local cache module 522. Still, once a third time point corresponding to the Stage_3 623 is determined, in the operation of Stage_3 623, the staged downloading agent 521 may start to download the data Obj1* at the third time point and also obtain a new delta token 3 corresponding to the third time point. The data Obj1* may be the changed data to Obj1 since the second time point of token 2, but not incremental data since the second time point of token 2. The data Obj1* may be stored in the local cache module 522 in the same way. In response to a request for data backup being received, the last stage, i.e., Stage_4 624, may be triggered and a last time point corresponding to the Stage_4 624 is determined. The staged downloading agent 521 may start to download incremental data Obj4 generated since the time point of token 3 at the last time point and also obtain a new delta token 4. It should be understood that the delta token 4 is the time point when a request of backup is received.

As illustrated in FIG. 6, the merging agent 523 may merge the data which has been downloaded since the previous backup 610. The downloaded data may comprise Obj1, Obj2, Obj3, Obj1*, and Obj4. The merged data may be Obj1*, Obj2, Obj3, Obj4. The data set (Obj1*, Obj2, Obj3, Obj4) may be the entire and up-to-date data between token 0 and token 4. The data set (Obj1*, Obj2, Obj3, Obj4) may be stored in the backup repository 524. As can be seen, the data Obj1 may be replaced by the changed data Obj1*. In this way, the present backup 620 may be completed.

According to embodiments of the present disclosure, the merging agent 523 may merge the downloaded data in the local cache 522 once the downloading is completed for each stage. The merging agent 523 may also progressively merge the downloaded data. For example, referring to FIG. 6, the merging agent 523 may merge the downloaded data once the Stage_3 623 is completed. The merged dataset, i.e., up-to-date data, may be Obj1*, Obj2, Obj3. The up-to-date data is updated after a merging operation. That is, the data Obj1 may be deleted and replaced by the changed data Obj1* for the up-to-date data in the local cache 522. Thus, the manner of progressive merging may delete out-of-date data in time and may also save time for later backup/merging.

It should be noted that in the example shown in FIG. 6, the data to be backed up may be downloaded in 4 stages. The number of stages is only illustrative and is not intended to suggest any limitation as to the scope of embodiments of the present invention.

Figure 7:
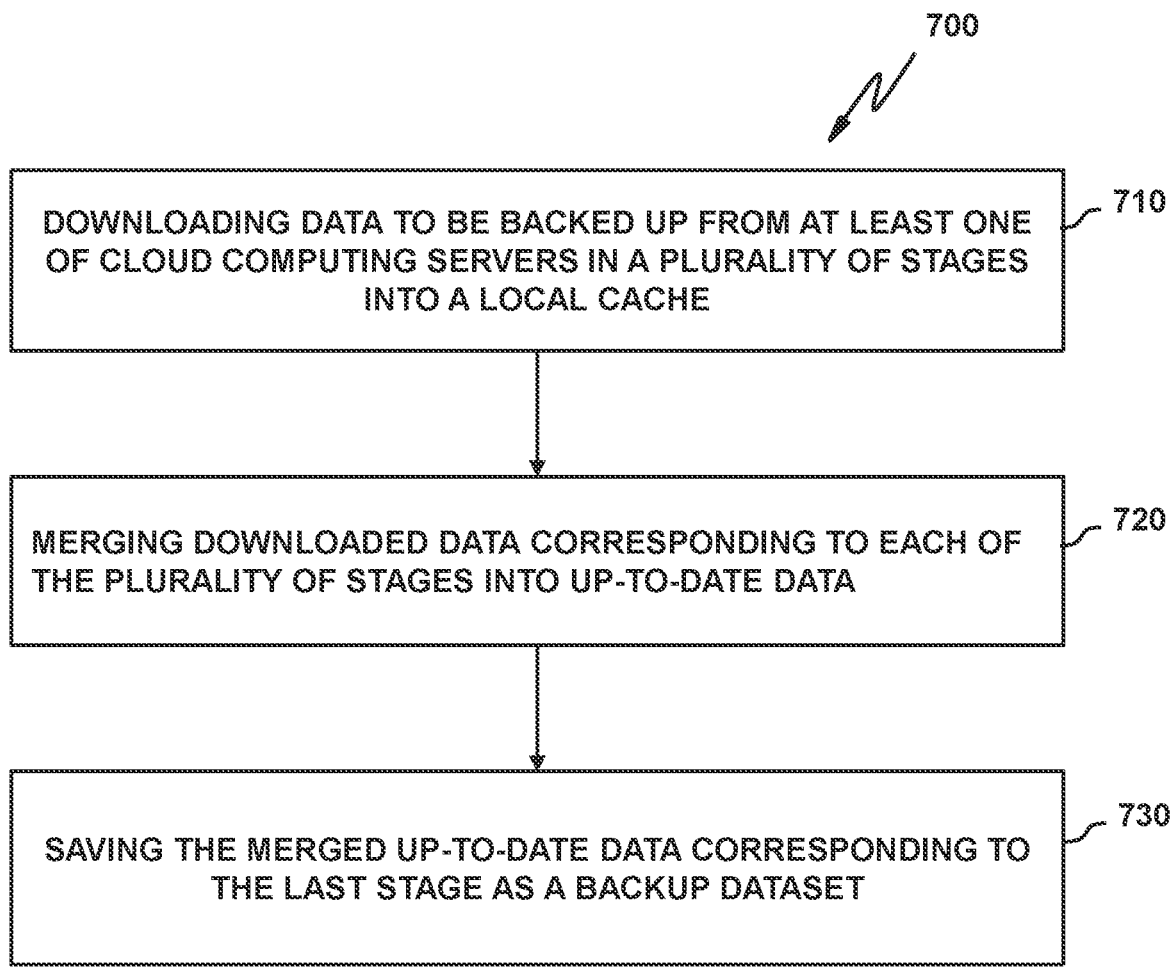
FIG. 7 depicts an example flow chart of a method for staged data backup according to embodiments of the present invention.

With reference now to FIG. 7, in which an example flow chart of a method 700 for staged data backup according to embodiments of the present invention is depicted. The method 700 may comprise operations 710-730.

At 710, the staged downloading agent 521 may download data to be backed up from at least one of cloud computing servers in a plurality of stages into the local cache 522, wherein each of the plurality of stages corresponds to a time point when a corresponding downloading operation starts, and a time point corresponding to the last stage of the plurality of stages is the time point when a request to back up the data is received.

At 720, the merging agent 523 may merge the downloaded data corresponding to each of the plurality of stages into up-to-date data.

At 730, the backup repository 524 may save the merged up-to-date data corresponding to the last stage as a backup dataset.

With the operations shown in the FIG. 7, the downloading operation of data to be backed up may start before the request to back up the data is received and may be divided into a plurality of stages. In this manner, after receiving the backup request, the backup may be completed faster and the probability of backup failure may be reduced. At the same time, the resources of cloud computing environment may be used better and the user experience may be improved.

Further, in some embodiments, at 710, the staged downloading agent 521 may download, at a time point corresponding to the current stage, incremental data or changed data occurred between time points corresponding to a previous stage and the current stage respectively.

In some embodiments, at 720, the merging agent 523 may in response to the incremental data being existed, reserve the incremental data in the up-to-date data; and in response to the changed data being existed, replace corresponding data with the changed data in the up-to-date data. In addition, the merging agent 523 may in response to the incremental data or the changed data corresponding to at least one stage being downloaded, perform the merging operation.

In some embodiments, at 710, the staged downloading agent 521 may determine the number of stages based on at least one of following: the amount of data to be backed up, estimated throttle limitation, available network bandwidth, historical data, requirements of a user and so on. The number of stages may be proportional to the amount of data to be downloaded per unit time and inversely proportional to the amount of data downloaded by a single user allowed by the throttle limitation per unit time.

In some embodiments, at 710, the staged downloading agent 521 may determine the time point for the stage other than the last stage. The determination may be based on at least one of following: the amount of data received from the cloud servers per unit time, estimated throttle limitation, available network bandwidth, and historical data. In response to the amount of data received from the cloud servers per unit time being less than a threshold, the staged downloading agent 521 may determine a time point corresponding to a stage when a corresponding downloading operation starts.

It should be noted that the processing of staged data backup system according to embodiments of this invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. However, the various embodiments can be practiced without these specific details. In other instances, well-known circuits, structures, and techniques have not been shown in detail in order not to obscure embodiments.

What is claimed is:

1. A computer-implemented method performed by one or more processors, the method comprising:
   downloading data to be backed up from at least one of cloud computing servers in a plurality of stages into a local cache, wherein each of the plurality of stages corresponds to a time point when a corresponding downloading operation starts, and a time point corresponding to the last stage of the plurality of stages is the time point when a request to back up the data is received;
   determining the number of the plurality of stages based on stage formula and adding a redundant value to the stage formula;
   merging downloaded data corresponding to each of the plurality of stages into up-to-date data; and
   saving the merged up-to-date data corresponding to the last stage as a backup dataset.

2. The computer-implemented method of claim 1, the downloading data to be backed up in a plurality of stages into a local cache comprising:
   downloading, at a time point corresponding to current stage, incremental data or changed data occurred between time points corresponding to a previous stage and the current stage respectively.

3. The computer-implemented method of claim 2, the merging the downloaded data corresponding to each of the plurality of stages into up-to-date data comprising:
   in response to an existence of the incremental data, reserving the incremental data in the up-to-date data; and in response to an existence of the changed data, replacing corresponding data with the changed data in the up-to-date data.

4. The computer-implemented method of claim 3, wherein the merging is performed in response to the incremental data or the changed data corresponding to at least one stage being downloaded.

5. The computer-implemented method of claim 1, wherein the stage formula is "StageNumber=Max(Datasize)/ThrottleLimitation and wherein the "Max(Datasize" is maximum amount of data to be downloaded for a single backup operation per unit of time during a historical period and "ThrottleLimitation" is the amount of data to be downloaded by a single user allowed by the throttle limitation per unit time during a historical period.

6. The computer-implemented method of claim 5, wherein the number of stages is proportional to the amount of data to be downloaded per unit time and inversely proportional to the amount of data downloaded by a single user allowed by the throttle limitation per unit time.

7. The computer-implemented method of claim 1, further comprising:
   determining the time point for the stage other than the last stage;
   wherein the time point for the stage other than the last stage is determined based on at least one of following: the amount of data received per unit time, estimated throttle limitation, available network bandwidth, and historical data.

8. The computer-implemented method of claim 7, further comprising:
   in response to the amount of data received per unit time being less than a threshold, determining a time point corresponding to a stage when a corresponding downloading operation starts.

9. A computer program product, the computer program product comprising a computer readable storage medium having program instructions embodied therewith, the program instructions executable by an electronic device to cause the electronic device to perform actions comprising:
   downloading data to be backed up from at least one of cloud computing servers in a plurality of stages into a local cache, wherein each of the plurality of stages corresponds to a time point when a corresponding downloading operation starts, and a time point corresponding to the last stage of the plurality of stages is the time point when a request to back up the data is received;
   determining the number of the plurality of stages based on stage formula and adding a redundant value to the stage formula;
   merging downloaded data corresponding to each of the plurality of stages into up-to-date data; and
   saving the merged up-to-date data corresponding to the last stage as a backup dataset.

10. The computer program product of claim 9, the downloading data to be backed up in a plurality of stages into a local cache comprising:
    downloading, at a time point corresponding to current stage, incremental data or changed data occurred between time points corresponding to a previous stage and the current stage respectively.

11. The computer program product of claim 10, the merging the downloaded data corresponding to each of the plurality of stages into up-to-date data comprising:
    in response to an existence of the incremental data, reserving the incremental data in the up-to-date data; and
    in response to an existence of the changed data, replacing corresponding data with the changed data in the up-to-date data.

12. The computer program product of claim 9, wherein the stage formula is "StageNumber=Max(Datasize)/ThrottleLimitation and wherein the "Max(Datasize" is maximum amount of data to be downloaded for a single backup operation per unit of time during a historical period and "ThrottleLimitation" is the amount of data to be downloaded by a single user allowed by the throttle limitation per unit time during a historical period.

13. A computer-implemented system, comprising:
    at least one processing unit; and
    a memory coupled to the at least one processing unit and storing instructions thereon, the instructions, when executed by the at least one processing unit, performing actions comprising:
       downloading data to be backed up from at least one of cloud computing servers in a plurality of stages into a local cache, wherein each of the plurality of stages corresponds to a time point when a corresponding downloading operation starts, and a time point corresponding to the last stage of the plurality of stages is the time point when a request to back up the data is received;
       determining the number of the plurality of stages based on stage formula and adding a redundant value to the stage formula;
       merging downloaded data corresponding to each of the plurality of stages into up-to-date data; and
       saving the merged up-to-date data corresponding to the last stage as a backup dataset.

14. The computer-implemented system of claim 13, the downloading data to be backed up in a plurality of stages into a local cache comprising:
    downloading, at a time point corresponding to current stage, incremental data or changed data occurred between time points corresponding to a previous stage and the current stage respectively.

15. The computer-implemented system of claim 14, the merging the downloaded data corresponding to each of the plurality of stages into up-to-date data comprising:
    in response to an existence of the incremental data, reserving the incremental data in the up-to-date data; and
    in response to an existence of the changed data, replacing corresponding data with the changed data in the up-to-date data.

16. The computer-implemented system of claim 15, wherein the merging is performed in response to the incremental data or the changed data corresponding to at least one stage being downloaded.

17. The computer-implemented system of claim 13, wherein the stage formula is "StageNumber=Max(Datasize)/ThrottleLimitation and wherein the "Max(Datasize" is maximum amount of data to be downloaded for a single backup operation per unit of time during a historical period and "ThrottleLimitation" is the amount of data to be downloaded by a single user allowed by the throttle limitation per unit time during a historical period.

18. The computer-implemented system of claim 17, wherein the number of stages is proportional to the amount of data to be downloaded per unit time and inversely proportional to the amount of data downloaded by a single user allowed by the throttle limitation per unit time.

19. The computer-implemented system of claim 13, further comprising:
   determining the time point for the stage other than the last stage;
   wherein the time point for the stage other than the last stage is determined based on at least one of following: the amount of data received per unit time, estimated throttle limitation, available network bandwidth, and historical data.

20. The computer-implemented system of claim 19, further comprising:
   in response to the amount of data received per unit time being less than a threshold, determining a time point corresponding to a stage when a corresponding downloading operation starts.

* * * * *